United States Patent
Yokota et al.

(10) Patent No.: US 11,842,235 B2
(45) Date of Patent: Dec. 12, 2023

(54) IMAGE FORMING APPARATUS WITH SUB-SCANNING-DIRECTION REFERENCE POSITION

(71) Applicant: KYOCERA Document Solutions Inc., Osaka (JP)

(72) Inventors: Hiroshi Yokota, Osaka (JP); Seiki Satomi, Osaka (JP); Yuichiro Kurokawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/115,086

(22) Filed: Feb. 28, 2023

(65) Prior Publication Data

US 2023/0281412 A1    Sep. 7, 2023

(30) Foreign Application Priority Data

Mar. 7, 2022   (JP) .................................. 2022-034088

(51) Int. Cl.
G06K 15/02   (2006.01)

(52) U.S. Cl.
CPC .............................. *G06K 15/1868* (2013.01)

(58) Field of Classification Search
CPC .................................................. G06K 15/1868
USPC ...................................................... 358/3.24
See application file for complete search history.

(56) References Cited

U.S. PATENT DOCUMENTS

| | | | | |
|---|---|---|---|---|
| 2005/0191100 A1* | 9/2005 | Ooshima | ............... | H04N 1/0075 399/370 |
| 2013/0120769 A1* | 5/2013 | Kakutani | ............... | G06K 15/10 358/1.8 |
| 2014/0218431 A1* | 8/2014 | Kakutani | ............... | G06K 15/10 347/15 |
| 2014/0368895 A1* | 12/2014 | Teramoto | ........... | H04N 1/00689 358/498 |
| 2017/0076185 A1* | 3/2017 | Mizuno | .............. | H04N 1/00411 |
| 2019/0001515 A1* | 1/2019 | Nishizaki | ................. | B26D 1/60 |

FOREIGN PATENT DOCUMENTS

JP   2020-182065   11/2020

* cited by examiner

*Primary Examiner* — Allen H Nguyen
(74) *Attorney, Agent, or Firm* — LEX IP MEISTER, PLLC

(57) ABSTRACT

A mask processor sets a mask area based on a shape of a print sheet read by an image sensor, masks an outer peripheral portion of a print image using the mask area, and causes a print engine to form a mask-processed print image. The mask processor (a) identifies a pixel in which the print sheet is detected in a line image obtained from an output of the image sensor, (b) detects a sub-scanning-direction reference position corresponding to an edge of the print sheet based on the number of pixels in which the print sheet is detected, and (c) sets a linear edge of the mask area at a line spaced apart by a specific number of offset lines from a line where the sub-scanning-direction reference position is detected toward a center of the print sheet.

4 Claims, 9 Drawing Sheets

FIG. 9

IMAGE FORMING APPARATUS WITH SUB-SCANNING-DIRECTION REFERENCE POSITION

INCORPORATION BY REFERENCE

This application is based upon, and claims the benefit of priority from, corresponding Japanese Patent Application No. 2022-034088 filed in the Japan Patent Office on Mar. 7, 2022, the entire contents of which are incorporated herein by reference.

BACKGROUND

Field of the Invention

The present disclosure relates to an image forming apparatus.

Description of Related Art

Conventionally there is an image forming apparatus configured to read out an image of a print sheet 51 before forming the image on the print sheet 51 by a sensor to obtain an outline image of the print sheet 51, reduce the outline image, set a mask area based on the reduced outline image, and mask an outer peripheral portion of the print image with the mask area to prevent a colored material from adhering to the outside of the print sheet 51.

SUMMARY

An image forming apparatus according to the present disclosure includes: a conveying belt to convey a print sheet; a print engine to form a print image by depositing a color material onto the print sheet; an image sensor to read out a shape of the print sheet; and a mask processor to set a mask area based on the shape of the print sheet read out by the image sensor, perform mask processing on an outer periphery of the print image using the mask area, and cause the print engine to form a mask-processed print image. The mask processor may (a) identify a pixel in which the print sheet is detected in a line image obtained from an output of the image sensor, (b) detect a sub-scanning-direction reference position corresponding to an edge of the print sheet based on the number of pixels in which the print sheet is detected, and (c) set a linear edge of the mask area at a line spaced apart by a specific number of offset lines from a line where the sub-scanning-direction reference position is detected toward a center of the print sheet 51.

DETAILED DESCRIPTION

Hereinafter, an embodiment according to the present disclosure will be explained with reference to drawings.

Figure 1:
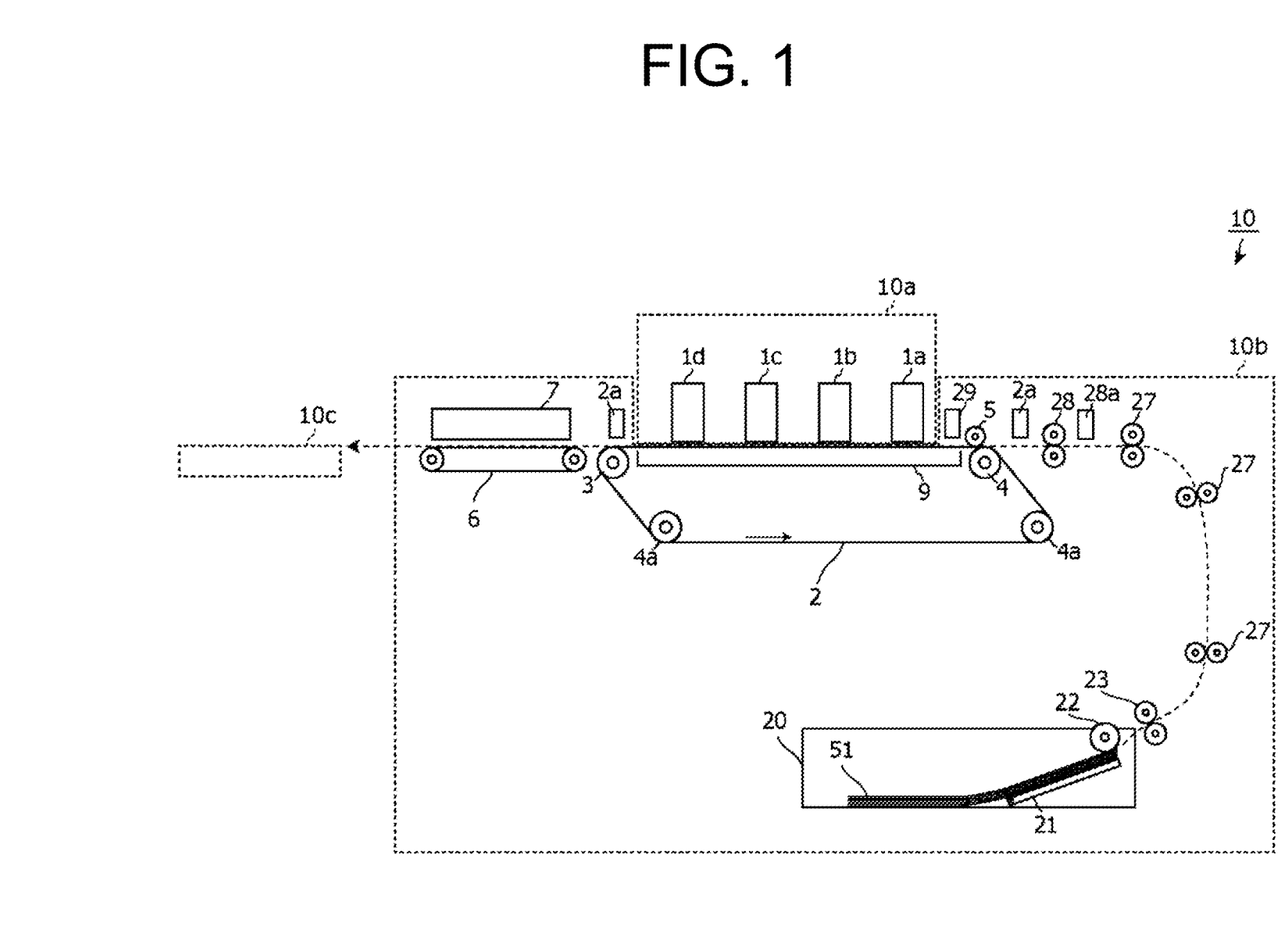
FIG. 1 is a side view illustrating an internal mechanical configuration of an image forming apparatus according to an embodiment of the present disclosure.
Figure 2:
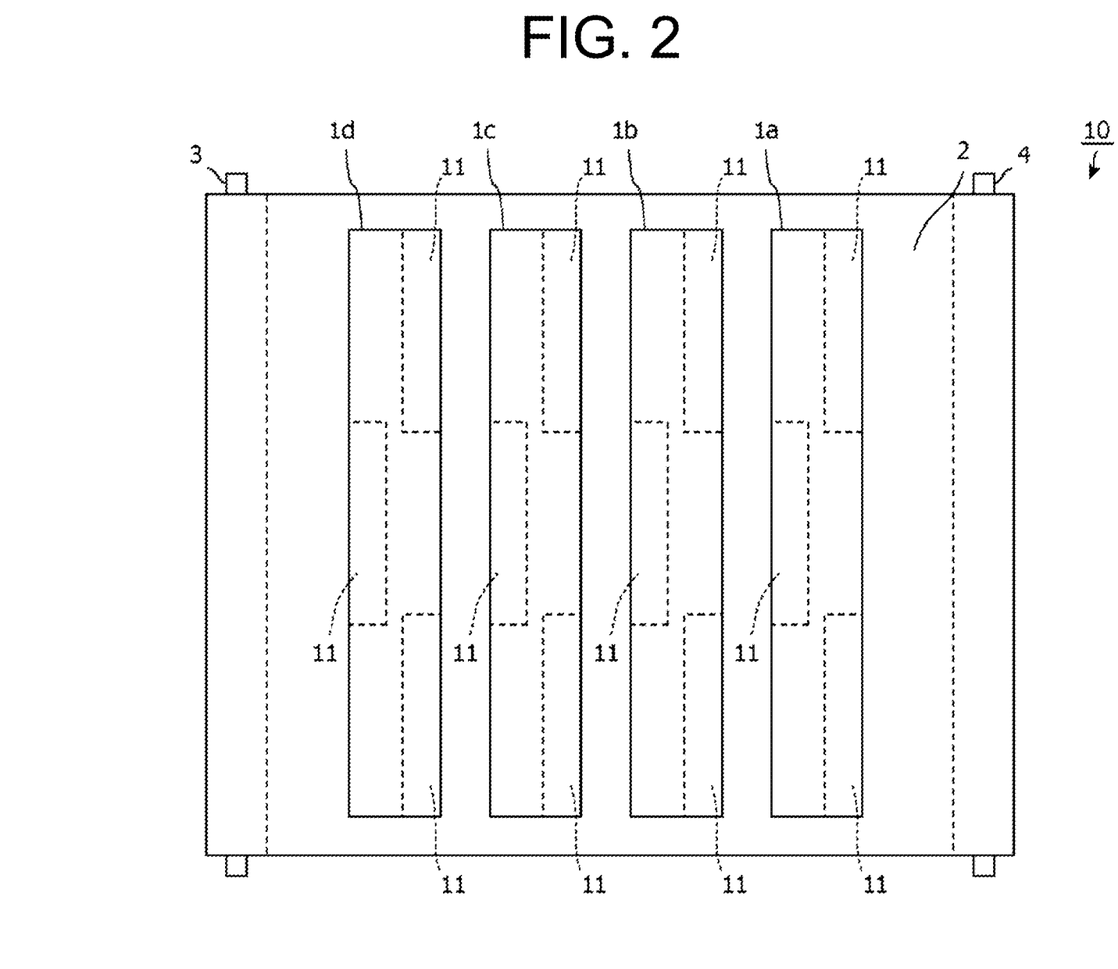
FIG. 2 is a plan view of the image forming apparatus shown in FIG. 1.

FIG. 1 shows a side view illustrating an internal mechanical configuration of an image forming apparatus according to the embodiment of the present disclosure. FIG. 2 shows a plan view of the image forming apparatus shown in FIG. 1.

The image forming apparatus 10 according to the present embodiment is an apparatus such as a printer, copier, facsimile machine, multifunction machine, and in the present embodiment it has a line-head-type inkjet color printing mechanism.

The image forming apparatus 10 shown in FIG. 1 has a print engine 10a and a sheet conveyor 10b. The print engine 10a adheres colored material to a print sheet 51 (e.g., print paper) and physically prints the image to be printed on the print sheet 51. An ink cartridge is detachable to/from the print engine 10a, and the print engine 10a performs print using ink supplied from ink cartridge. The sheet conveyor 10b conveys the print sheet 51 to the print engine 10a.

In the present embodiment, the print engine 10a has a line-head-type inkjet recording parts 1a to 1d corresponding to four ink colors which are cyan, magenta, yellow, and black, and inkjet recording parts 1a to 1d discharge ink onto the print sheet 51.

As shown in FIG. 2, in the present embodiment, each of inkjet recording parts 1a, 1b, 1c, and 1d has one or more (here three) head sections 11. Those head sections 11 are arranged along a main scanning direction so as to be detachable to/from the apparatus body. The head section 11 (i.e., each of inkjet recording parts 1a, 1b, 1c, and 1d) has a plurality of nozzles arranged in the main scanning direction and discharges ink from the nozzles onto the print sheet 51.

In the present embodiment, the sheet conveyor 10b has a conveying belt 2 positioned facing the print engine 10a to convey a print sheet 51, a drive roller 3, a driven roller 4, and a tension roller 4a on which the conveying belt 2 is suspended, a suction roller 5 nipping the print sheet 51 together with the conveying belt 2, a rear conveying belt 6, and a dryer 7.

The drive roller 3, driven roller 4, and tension roller 4a circulate the conveying belt 2. The suction roller 5 nips the print sheet 51 conveyed from a paper feeding cassette 20 described below, and the nipped print sheet 51 is conveyed in turn by the conveying belt 2 to print positions of inkjet recording parts 1a to 1d, at which respective color images are printed by inkjet recording parts 1a to 1d. At this time, a sheet sensor 2a detects passage of the print sheet 51, and a current position of the print sheet 51 on a conveying path is identified based on the detection timing, thereby printing the image at an appropriate position on the print sheet 51. Then, the print sheet 51 which has been printed is ejected by the rear conveying belt 6 to the ejection tray 10c, etc. At this time, the print sheet 51 on which ink has been discharged is dried by the dryer 7. The sheet suction part 9 is located along the sheet conveying path. Negative pressure is applied to the sheet suction part 9, thereby sucking the print sheet 51 onto the conveying belt 2 through the sheet suction holes.

Furthermore, the sheet conveyor 10b has the paper feeding cassette 20 as a paper feed source. The paper feeding cassette 20 accommodates print sheets 51, and a lifting plate 21 pushes the print sheets 51 upward to bring it into contact with a pickup roller 22. The print sheets 51 mounted on the paper feeding cassette 20 are picked up by the pickup roller 22 one by one from the top of the bunch of the print sheets 51 and fed to a paper feeding roller 23. The paper feeding roller 23 conveys the print sheets 51 fed by the pickup roller 22 from the paper feeding cassette 20 on the conveying path one by one.

A conveying roller 27 conveys the print sheet 51 on a specific conveying path. When a print sheet 51 being conveyed is detected by a resist sensor 28a, a resist roller 28 pauses the print sheet 51 and conveys the print sheet 51 to the print engine 10a (specifically, to a nip position between the suction roller 5 and the conveying belt 2) at a secondary paper feeding timing. The secondary paper feeding timing is designated by a controller 81 described below so that an image is formed at the designated position on that print sheet 51.

In addition, an image sensor 29 is provided above the conveying belt 2. The image sensor 29 is an optical sensor, for example, a line sensor (here, a Contact Image Sensor (CIS)) arranged along the main scanning direction. The image sensor 29 identifies the color at each position within a specific range in the main scanning direction by irradiating light onto the conveying belt 2 with LEDs, for example, and detecting the reflected light with each light receiving element, such as a photodiode. This allows the image sensor 29 to read out the shape of the print sheet 51 being conveyed on the conveying belt 2.

Figure 3:
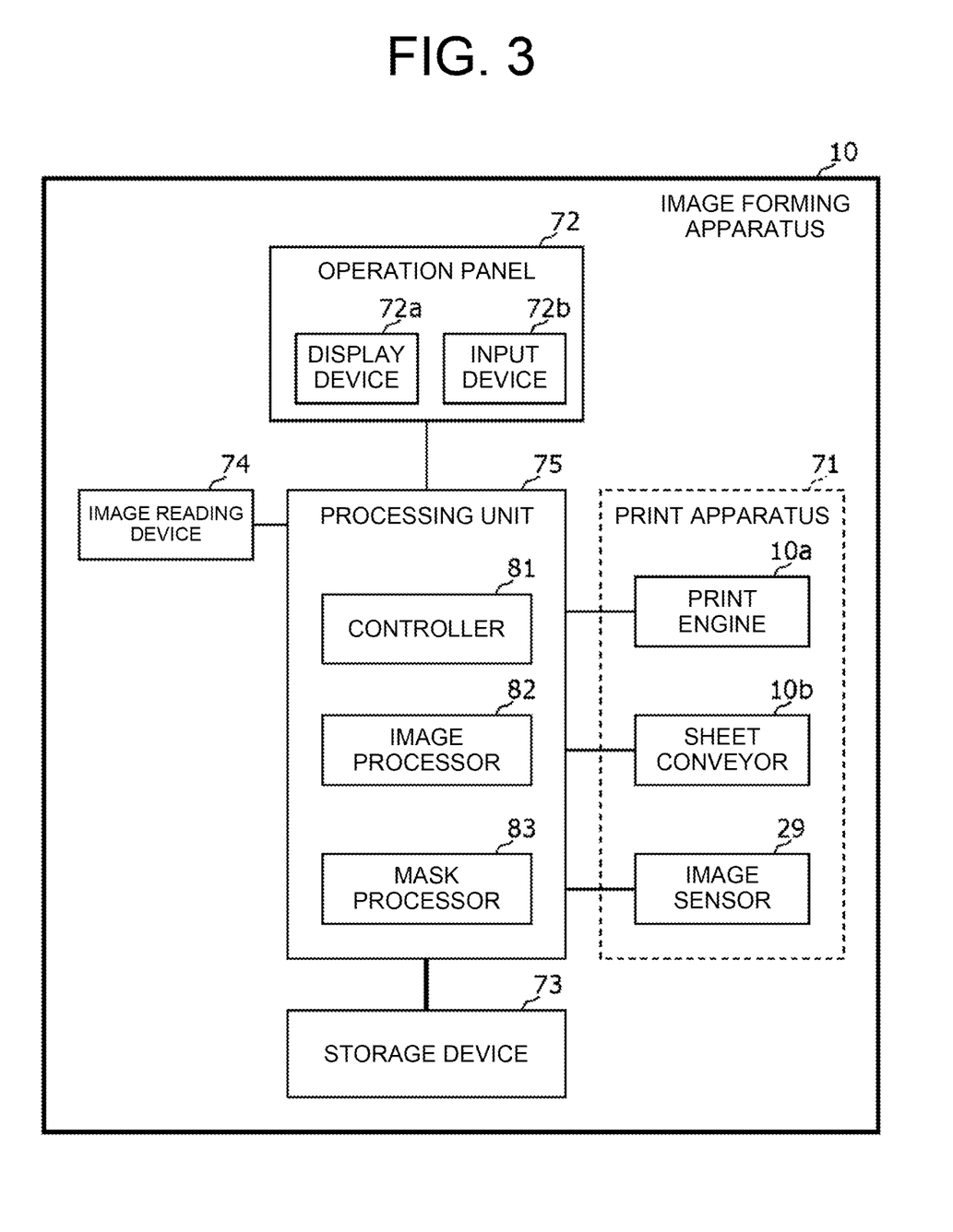
FIG. 3 is a block diagram illustrating an electric configuration of the image forming apparatus 10 according to the embodiment of the present disclosure.

FIG. 3 is a block diagram illustrating an electric configuration of the image forming apparatus 10 according to the embodiment of the present disclosure. As shown in FIG. 3, in addition to the print apparatus 71, which has the mechanical configuration shown in FIGS. 1 and 2, the image forming apparatus 10 further includes an operation panel 72, a storage device 73, an image reading device 74, and a processing unit 75.

The operation panel 72 is located on the surface of a chassis of the image forming apparatus 10 and has a display device 72a such as a liquid crystal display, and an input device 72b such as a hard key, a touch panel or the like. The display device 72a displays various messages to the user, and the input device 72b accepts user's operation.

The storage device 73 is a nonvolatile memory (such as a flash memory, a hard disk drive, etc.) to store data, programs, etc. necessary for controlling the image forming apparatus 10.

The image reading device 74 has a platen glass and an automatic document feeder, and optically reads out an image of a document placed on the platen glass or being conveyed by the automatic document feeder, and generates image data of the image.

The processing unit 75 includes a computer which operates in accordance with a program, an ASIC (Application Specific Integrated Circuit) or the like which performs a specific operation, and operates as sorts of processors. The computer includes a CPU (Central Processing Unit), a ROM (Read Only Memory), a RAM (Random Access Memory) and the like, and operates as sorts of processors (together with the ASIC as necessary) by loading a program into the RAM from the ROM, the storage device 73 or the like and executing the programs by the CPU.

Here, the processing unit 75 operates as the controller 81, an image processor 82, and a mask processor 83. In the present embodiment, the controller 81 is realized as software in the computer mentioned above, and the mask processor 83 is realized as a dedicated hardware in the ASIC mentioned above.

The controller 81 controls the print apparatus 71 (print engine 10a, sheet conveyor 10b, etc.) and executes print jobs requested by the user. In the present embodiment, the controller 81 causes the image processor 82 to perform a specific image process and controls the print engine 10a (head section 11) to discharge ink to form a print image on the print sheet 51. The image processor 82 performs a specific image process, such as RIP (Raster Image Processing), color conversion, and halftoning, over the image data of an image to be printed on the print sheet 51. This allows the image data for a print image to be generated.

The controller 81 outputs the generated image data for the print image to the mask processor 83. The mask processor 83 performs the mask processing described below on the print image and causes the print engine 10a to print the mask-processed print image.

The mask processor 83 sets a mask area based on the shape of the print sheet 51 read out by the image sensor 29, performs mask processing on the outer peripheral portion of the print image using the mask area, and causes the print engine 10a to form the mask-processed print image.

Figure 4:
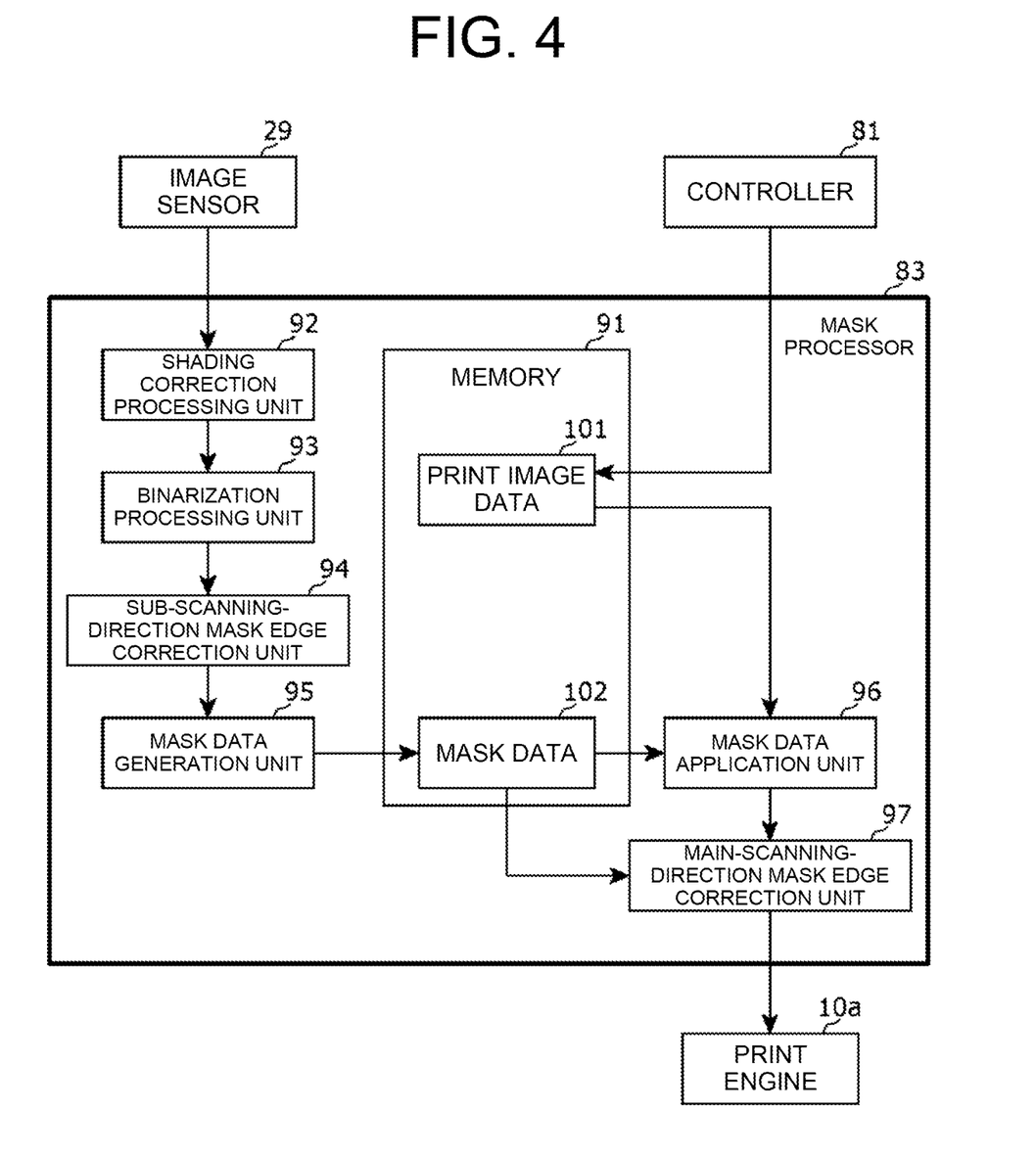
FIG. 4 is a block diagram illustrating the detailed configuration of the mask processor 83 shown in FIG. 3.

FIG. 4 is a block diagram illustrating the detailed configuration of the mask processor 83 in FIG. 3. As shown in FIG. 4, the mask processor 83 has a memory 91, a shading correction processing unit 92, a binarization processing unit 93, a sub-scanning-direction mask edge correction unit 94, a mask data generation unit 95, a mask data application unit 96, and a main-scanning-direction mask edge correction unit 97.

The memory 91 stores print image data 101 and mask data 102 from the controller 81. The memory 91 is, for example, the RAM described above.

The shading correction processing unit 92 performs shading processing on line images generated per line by the image sensor 29.

The binarization processing unit 93 performs binarization processing on the line image with the shading correction processing having been done to generate a binarized line image.

The sub-scanning-direction mask edge correction unit 94 (a) identifies a pixel in which the print sheet 51 is detected (i.e., pixel whose pixel value indicates the surface color of the print sheet 51 rather than the surface color of the conveying belt 2) in the line image (here, the binary line image described above) obtained from the output of the image sensor 29, (b) detecting a sub-scanning-direction reference position corresponding to the edge of the print sheet 51 based on the number of pixels in which the print sheet 51 is detected, and (c) sets a linear edge of a mask area at a line spaced apart by a specific number of offset lines from the line where the sub-scanning-direction reference position is detected toward a center of the print sheet 51.

The mask data generation unit 95 generates mask data 102 indicating a mask area corresponding to the mask edge set by the sub-scanning-direction mask edge correction unit 94 and stores the same in the memory 91.

Figure 5:
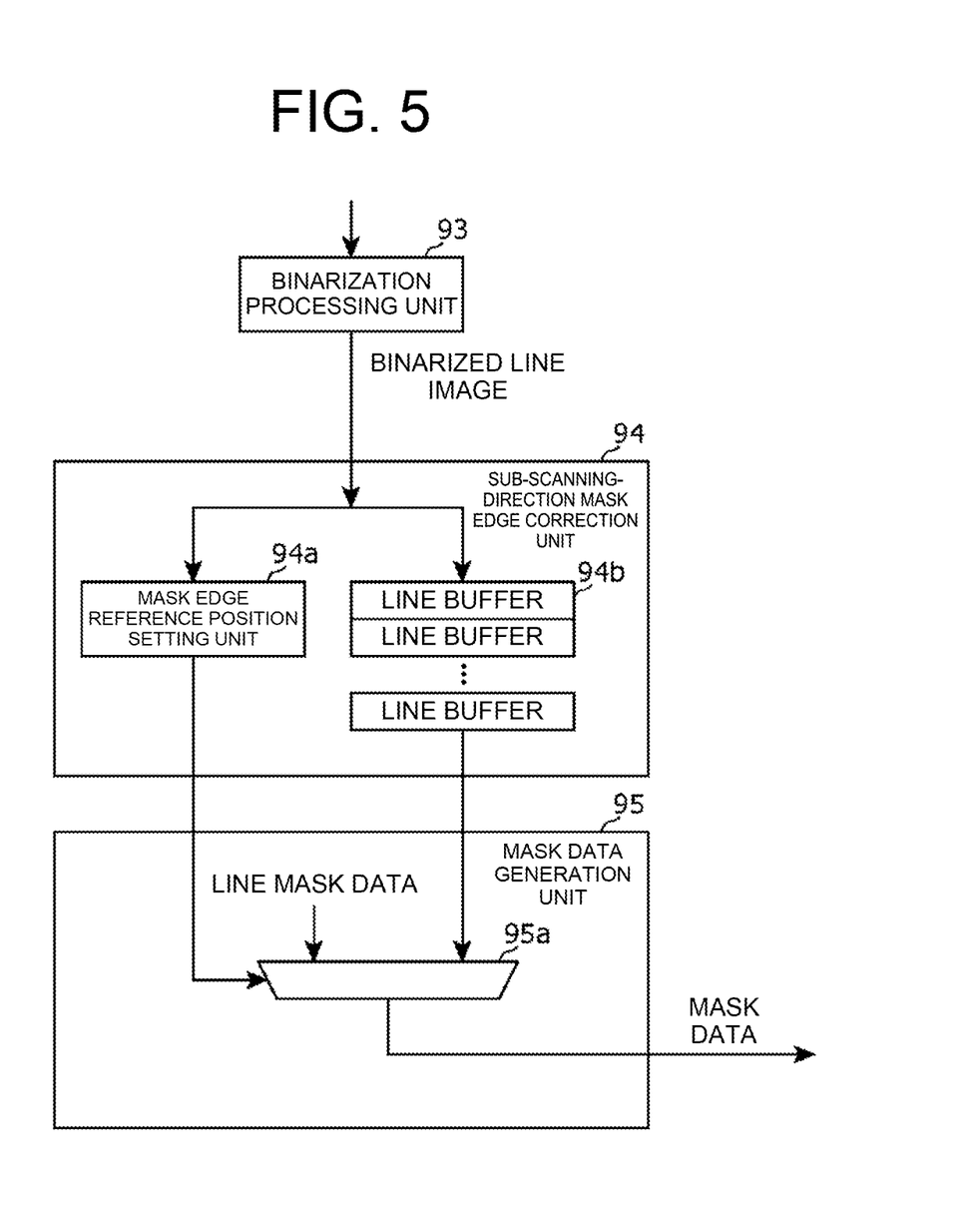
FIG. 5 is a diagram illustrating the detailed configuration of a sub-scanning-direction mask edge correction unit 94 and a mask data generation unit 95 shown in FIG. 4.

FIG. 5 shows the detailed configuration of the sub-scanning-direction mask edge correction unit 94 and mask data generation unit 95 shown in FIG. 4.

As shown in FIG. 5, the sub-scanning-direction mask edge correction unit 94 has a mask edge reference position setting unit 94*a* and a line buffer 94*b*, while the mask data generation unit 95 has a selector 95*a*. As described above, the mask edge reference position setting unit 94*a* detects a sub-scanning-direction reference position (reference positions on a front edge side and a rear edge side of the print sheet 51) based on the number of pixels in which the print sheet 51 is detected in the line image. The line buffer 94*b* is a multi-stage line buffer to delay the line image (here, the binarized line image output from the binarization processing unit 93) by at least the number of offset lines.

The mask processor 83 generates mask data indicating the mask area per line and masks the print image based on the mask data. The mask data generation unit 95 generates fixed line mask data (line image data with a blank (no density) pixel value), and the selector 95*a* selects either the line image delayed by the line buffer 94*b* or a specific line mask data for each line, and defines the selected line image or selected line mask data as mask data for the line.

Specifically, upon the sub-scanning-direction reference position corresponding to the rear edge of the print sheet 51 being detected by the mask edge reference position setting unit 94*a*, the selector 95*a* selects the line mask data from among the delayed line image and line mask data and defines the same as the mask data for the line. This allows the line mask data to be applied from a line before the rear edge of the print sheet by the number of offset lines.

Upon the sub-scanning-direction reference position corresponding to the front edge of the print sheet 51 being detected, the mask edge reference position setting unit 94*a* sets a line after the front edge of the print sheet by the number of offset lines as a mask front edge, causes the selector 95*a* to select the line mask data for the lines up to that line, and defines the line mask data as a mask data for each line.

Figure 6:
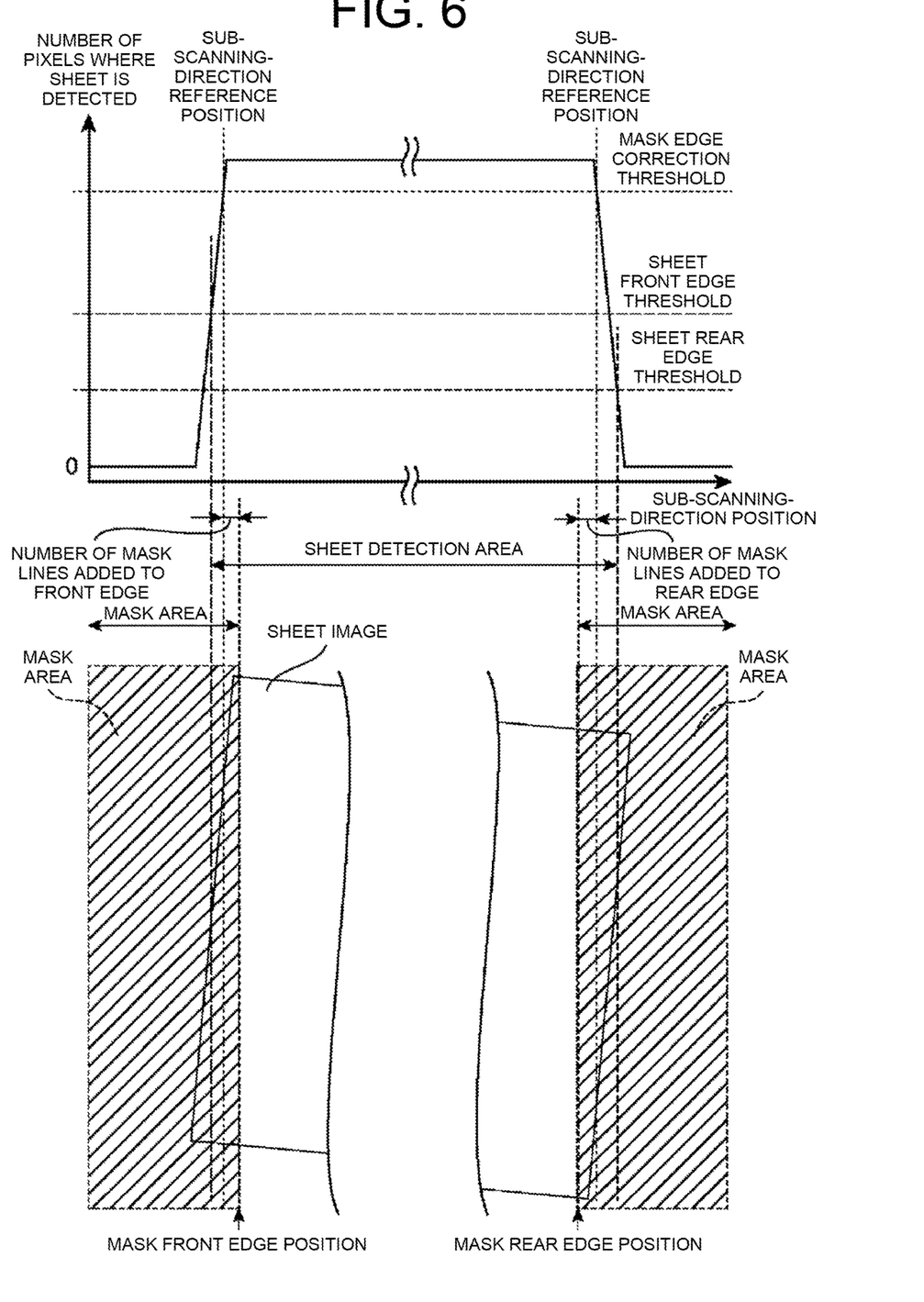
FIG. 6 is an explanatory diagram illustrating a front edge and rear edge of the mask area (i.e., mask edge in a sub-scanning direction), which is set in the mask processor 83 shown in FIGS. 3 to 5.

FIG. 6 is an explanatory diagram illustrating a front edge and rear edge of the mask area (i.e., mask edge in a sub-scanning direction), which is set in the mask processor 83 shown in FIGS. 3 to 5.

The mask processor 83 (*a*) compares the number of pixels in which the print sheet 51 is detected with a specific first threshold value (here, a sheet front edge threshold value shown in FIG. 6 with respect to the frond edge of the print sheet 51 and a sheet rear edge threshold value shown in FIG. 6 with respect to the rear edge of the print sheet 51) to detect edges (front edge and rear edge) of the print sheet 51 and set the print timing of the print image corresponding to the detected edge position of the print sheet 51, and (b) compares the number of pixels in which the print sheet 51 is detected with a specific second threshold value (here, a mask edge correction threshold value shown in FIG. 6) to detect the sub-scanning-direction reference position. The second threshold is set so as to be larger than the first threshold.

Specifically, if the number of pixels in which the print sheet 51 is detected of a previous line is less than the sheet front edge threshold and the number of pixels in which the print sheet 51 is detected of a current line is not less than the sheet front edge threshold, the current line is determined as the front edge of the print sheet 51. If the number of pixels in which the print sheet 51 is detected of the previous line is not less than the sheet rear edge threshold and the number of pixels in which the print sheet 51 is detected of the current line is less than the sheet rear edge threshold, the current line is determined as the rear edge of the print sheet 51.

If the number of pixels in which the print sheet 51 is detected of the previous line is less than the mask edge correction threshold and the number of pixels in which the print sheet 51 is detected of the current line is not less than the mask edge correction threshold, the current line is determined as the mask front edge. If the number of pixels in which the print sheet 51 is detected of the previous line is not less than the mask edge correction threshold and the number of pixels in which the print sheet 51 is detected of the current line is less than the mask edge correction threshold, the current line is determined as a mask rear edge.

In this way, since the second threshold for setting the mask edge is used separately from the first threshold for detecting the front edge and rear edge of the print sheet 51, even when the print sheet 51 is placed obliquely with respect to the conveying direction, the mask area can be set so that the mask edges are located between the front edge and the rear edge of the obliquely placed print sheet 51, according to the front edge and rear edge of the placed print sheet 51.

The mask data application unit 96 reads out the mask data 102 one line at a time from the memory 91 to apply it to a corresponding line and thus the print image data 101. As described above, the mask edges in a sub scanning direction is already corrected (i.e., which are set taking into account of oblique placement of the print sheet 51 with respect to the conveying direction) in the mask data 102, but the mask edges in a main scanning direction are corrected by the main-scanning-direction mask edge correction unit 97.

The main-scanning-direction mask edge correction unit 97 (*a*) from the line where the edge of the mask area corresponding to the front edge of the print sheet 51 is set to the line where the edge of the mask area corresponding to the rear edge of the print sheet 51 is set, detects a left edge coordinate and a right edge coordinate of each line image of the mask data in the main scanning direction and updates a maximum value of the left edge coordinate and a minimum value of the right edge coordinate in the main scanning direction, (b) sets edges of the mask area in the main scanning direction to the maximum value of the left edge coordinate and the minimum value of the right edge coordinate, and (c) masks a range between the maximum value of the left edge coordinate and the minimum value of the right edge coordinate of the print image data to which the mask data 102 is applied (specifically, pixel values in the range are set to no density value).

Figure 7:
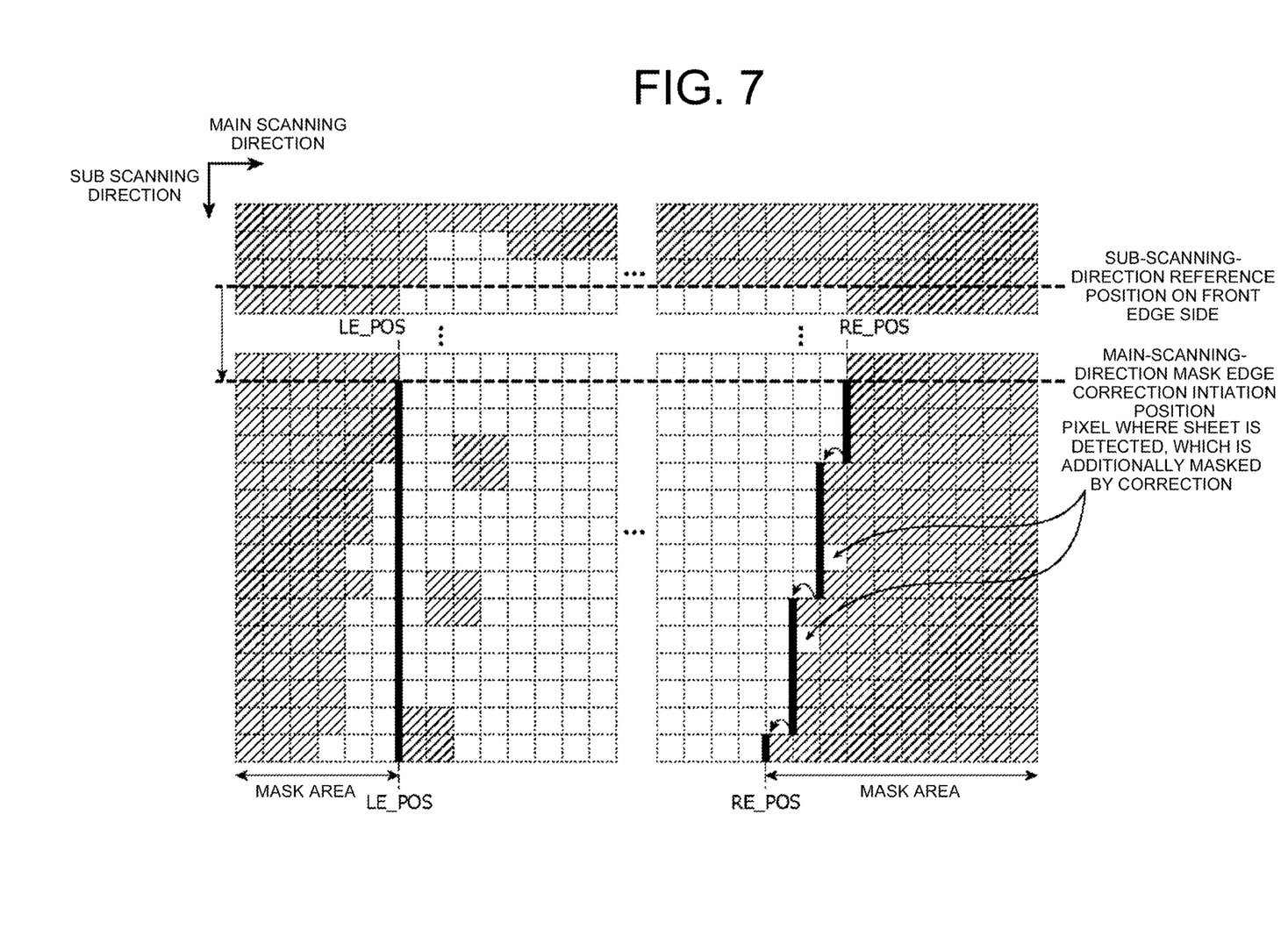
FIG. 7 is an explanatory diagram illustrating a left edge and right edge of the mask area (i.e., mask edges in a main scanning direction), which is set in the mask processor 83 shown in FIGS. 3 to 5, continuing to FIG. 8.
Figure 8:
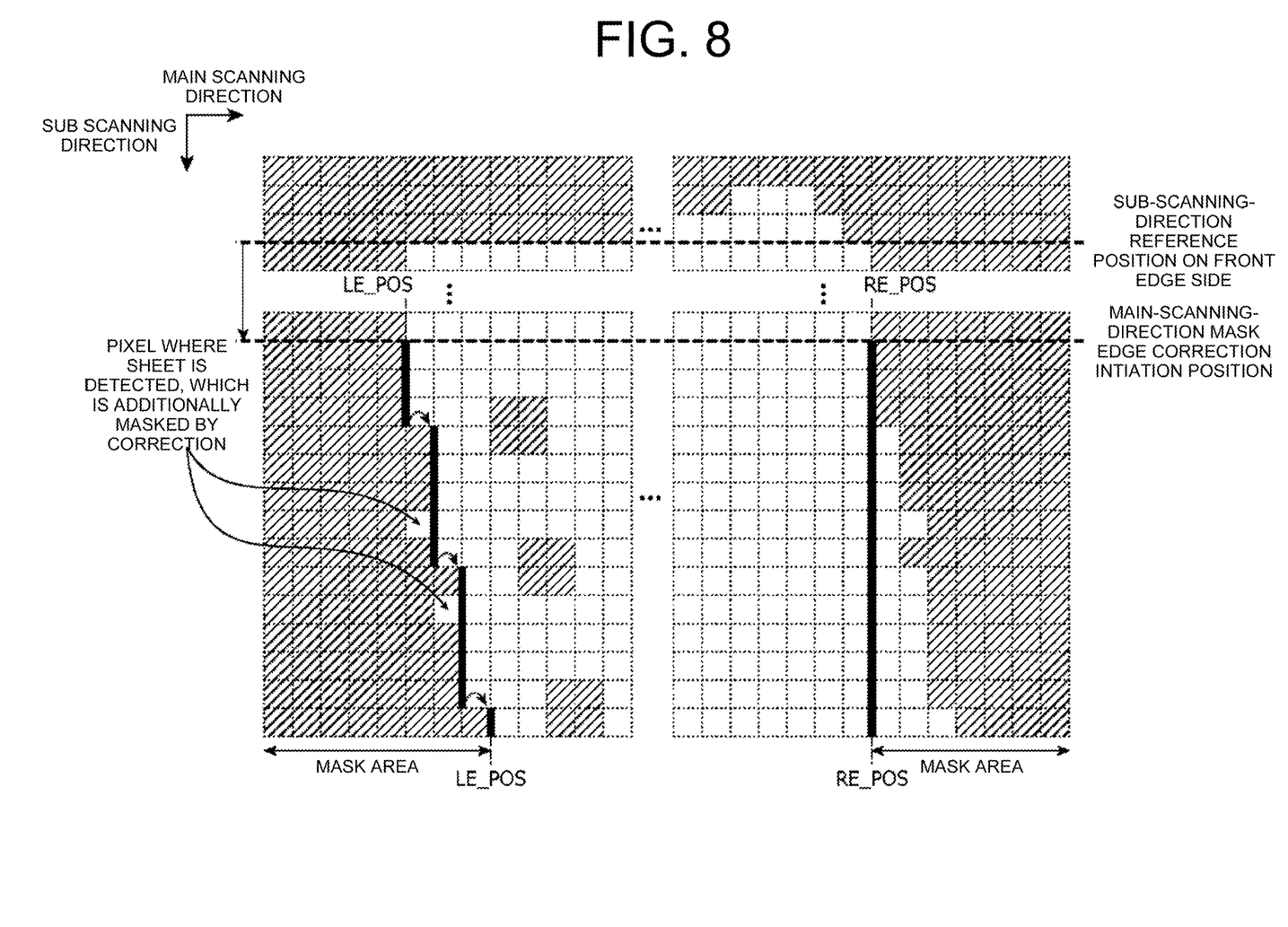
FIG. 8 is an explanatory diagram illustrating a left edge and right edge of the mask area (i.e., mask edges in the main scanning direction), which is set in the mask processor 83 shown in FIGS. 3 to 5.

FIGS. 7 and 8 are explanatory diagrams illustrating a left edge and right edge of the mask area (i.e., mask edges in a main scanning direction), which is set in the mask processor 83 shown in FIGS. 3 to 5.

Figure 9:
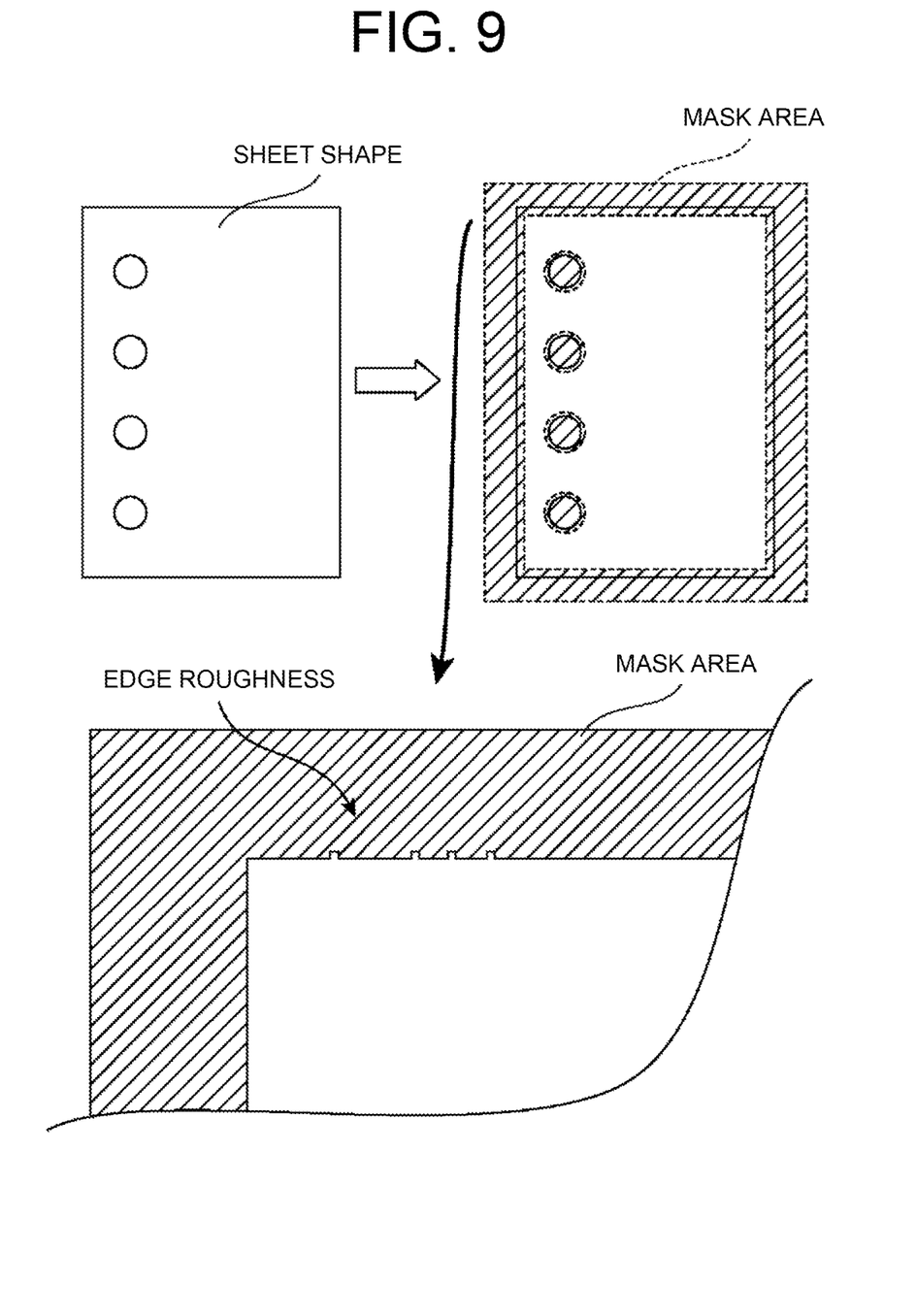
FIG. 9 is an explanatory diagram of a mask area corresponding to a sheet shape.

For example, as shown in FIG. 7, if the print sheet 51 (with s sheet-like shape as shown in FIG. 9) is placed obliquely in a clockwise direction, the maximum value of the left edge coordinate LE_POS is constant but the minimum value of the right edge coordinate RE_POS gradually become smaller.

For example, as shown in FIG. 8, if the print sheet 51 (with a sheet-like shape as shown in FIG. 9) is placed obliquely in a counterclockwise direction, the minimum value of the right edge coordinate RE_POS is constant but the maximum value of the left edge coordinate LE_POS gradually become larger.

Next, the operation of the above mentioned image forming apparatus 10 will be explained below.

When the controller 81 receives a print request, it generates image data for the image to be printed designated by the print request and causes the sheet conveyor 10b to start conveying the print sheet 51.

When conveyance of the print sheet 51 is initiated, the image sensor 29 repeatedly outputs the line image to the mask processor 83, and the mask processor 83 detects the front edge of the print sheet 51 based on the number of pixels in which the print sheet 51 is detected in the binarized line image, as shown in FIG. 6, and detects the sub-scanning-direction reference position corresponding to the front edge of the print sheet 51, sets the line position after the sub-scanning-direction reference position by a specific number of offset lines as the mask front edge, and masks the print image up to the mask front edge.

Therefore, the line mask data up to the line of the mask front edge is output from the mask processor 83 to the print engine 10a, so that the print image is not printed through the print engine 10a.

For the lines after the mask front edge, the mask processor 83 outputs to the print engine 10a the print image in which the mask edge in the main scanning direction is corrected as described above. Therefore, the print engine 10a prints one line at a time the print image in which the outer area of the mask edge corrected in the main scanning direction is masked.

Then, the mask processor 83 detects the rear edge of the print sheet 51 based on the number of pixels in which the print sheet 51 is detected in the binarized line image as shown in FIG. 6 above, detects the sub-scanning-direction reference position corresponding to the rear edge of the print sheet 51, sets the line position before the sub-scanning-direction reference position by a specific number of offset lines as the mask rear edge, and masks the print image for the lines after the mask rear edge.

Therefore, the line mask data for the lines after the mask rear edge is output from the mask processor 83 to the print engine 10a, so that the print image is not printed through the print engine 10a.

According to the present embodiment mentioned above, the mask processor 83 sets the mask area based on the shape of the print sheet 51 read by the image sensor 29, masks the outer peripheral portion of the print image using the mask area, and causes the print engine 10a to form the mask-processed print image. At that event, the mask processor 83 (a) identifies the pixels in which the print sheet 51 is detected of the line image obtained from the output of the image sensor 29, (b) detects the sub-scanning-direction reference position corresponding to the edge of the print sheet 51 based on the number of pixels in which the print sheet 51 is detected, and (c) sets a linear edge of the mask area at a line spaced apart by a specific number of offset lines from the line where the sub-scanning-direction reference position is detected toward a center of the print sheet 51.

This can prevent the quality of the edges of the image formed on the print sheet 51 from being degraded due to the mask processing. In particular, even if the print sheet 51 is placed obliquely with respect to the conveying direction, the sub-scanning-direction reference position can be set according to the degree of obliquity, and the mask edge is set corresponding to the sub-scanning-direction reference position, so that the outer peripheral portion of the print image is appropriately masked.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the embodiment mentioned above, the print engine 10a is an inkjet type print engine, but the print engine 10a may be a print engine of another type, such as an electrophotographic type.

In the above form, the mask edge is set by using the selector 95a to select either the line image delayed by the line buffer 94b or the line mask data, but instead of the selector 95a, the output of the line buffer 94b may be set as the mask data so that when the sub-scanning-direction reference position on the rear edge side is detected, the line image in the line buffer 94b is overwritten with the line mask data.

Furthermore, in the embodiment mentioned above, only correction of mask edges in the sub-scanning direction may be performed without correction of mask edges in the main scanning direction.

The present disclosure can be applied to the image forming apparatus, for example.

What is claimed is:

1. An image forming apparatus comprising:
   a conveying belt to convey a print sheet;
   a print engine to form a print image by depositing a color material onto the print sheet;
   an image sensor to read out a shape of the print sheet; and
   a mask processor to set a mask area based on the shape of the print sheet read out by the image sensor, perform mask processing on an outer periphery of the print image using the mask area, and cause the print engine to form a mask-processed print image,
   wherein the mask processor (a) identifies a pixel in which the print sheet is detected in a line image obtained from an output of the image sensor, (b) detects a sub-scanning-direction reference position corresponding to an edge of the print sheet based on the number of pixels in which the print sheet is detected, and (c) sets a linear edge of the mask area at a line spaced apart by a specific number of offset lines from a line where the sub-scanning-direction reference position is detected toward a center of the print sheet.

2. The image forming apparatus according to claim 1, wherein
   the mask processor (a) compares the number of pixels in which the print sheet is detected with a specific first threshold value to detect the edge of the print sheet, and
   (b) compares the number of pixels in which the print sheet is detected with a specific second threshold value to detect the sub-scanning-direction reference position, and
   the second threshold value is greater than the first threshold value.

3. The image forming apparatus according to claim 1, wherein
   the mask processor generates mask data indicating the mask area per line and masks the print image based on the mask data,
   the mask processor causes plural multi-stage line buffers to delay the line image by at least the number of offset lines, selects either the delayed line image or specific line mask data for each line, and defines the selected line image or the line mask data as the mask data for the line, and
   upon the sub-scanning-direction reference position corresponding to a rear edge of the print sheet being detected, the mask processor selects the line mask data from among the delayed line image and the line mask data and defines the selected line mask data as the mask data for the line.

4. The image forming apparatus according to claim 1, wherein the mask processor (a) from a line where an edge of the mask area corresponding to a front edge of the print sheet is set to a line where an edge of the mask area corresponding to the rear edge of the print sheet is set, detects a left edge coordinate and a right edge coordinate of each line image in a main scanning direction and updates a maximum value of the left edge coordinate and a minimum value of the right edge coordinate in the main scanning direction, (c) sets edges of the mask area in the main scanning direction to the maximum value of the left edge coordinate and the minimum value of the right edge coordinate.

* * * * *